United States Patent [19]

Volk et al.

[11] Patent Number: 4,668,946
[45] Date of Patent: May 26, 1987

[54] SYSTEM FOR DETECTING THE FAILURE OF A FILAMENT LAMP

[75] Inventors: Jack R. Volk, Ann Arbor; Philip Piatkowski, Jr., Fraser, both of Mich.

[73] Assignee: Ford Motor Company, Dearborn, Mich.

[21] Appl. No.: 817,223

[22] Filed: Jan. 8, 1986

[51] Int. Cl.⁴ .............................................. G08B 21/00
[52] U.S. Cl. ................................. 340/641; 307/10 LS; 315/82; 340/79
[58] Field of Search ............. 340/641, 642, 643, 52 F, 340/73, 79, 80, 52 R; 315/82, 83, 130; 361/87, 93; 307/10 LS, 131

[56] References Cited

U.S. PATENT DOCUMENTS

| | | | |
|---|---|---|---|
| 3,457,561 | 7/1969 | Zeisler | 340/79 |
| 3,532,928 | 10/1970 | West | 315/83 |
| 3,633,196 | 1/1972 | Winkler | 340/642 |
| 3,784,877 | 1/1974 | Cowell | 361/93 X |
| 3,801,975 | 4/1974 | Kitano | 315/130 |
| 3,840,852 | 10/1974 | Schwellenbach | 340/80 |
| 3,868,628 | 2/1975 | Sakarai | 340/80 |
| 3,898,513 | 8/1975 | Kopernik et al. | 315/129 |
| 3,995,262 | 11/1976 | France et al. | 340/643 |
| 4,105,996 | 8/1978 | Shimizu | 340/73 |
| 4,214,236 | 7/1980 | Carp et al. | 340/642 |
| 4,217,576 | 8/1980 | Wreford-Howard | 340/642 |
| 4,234,866 | 11/1980 | Kuroda et al. | 340/52 F |
| 4,348,613 | 9/1982 | Hormel et al. | 315/130 |
| 4,376,909 | 3/1983 | Tagami et al. | 315/82 |

Primary Examiner—James L. Rowland
Assistant Examiner—Daniel Myer
Attorney, Agent, or Firm—Paul K. Godwin, Jr.; Clifford L. Sadler

[57] ABSTRACT

A filament lamp outage indicator system in which the actuation of an on/off switch to its on position is sensed to enable a logic circuit in the event a current flow increase is not inductively detected in a conductor in series with the switch and a corresponding filament lamp.

6 Claims, 3 Drawing Figures

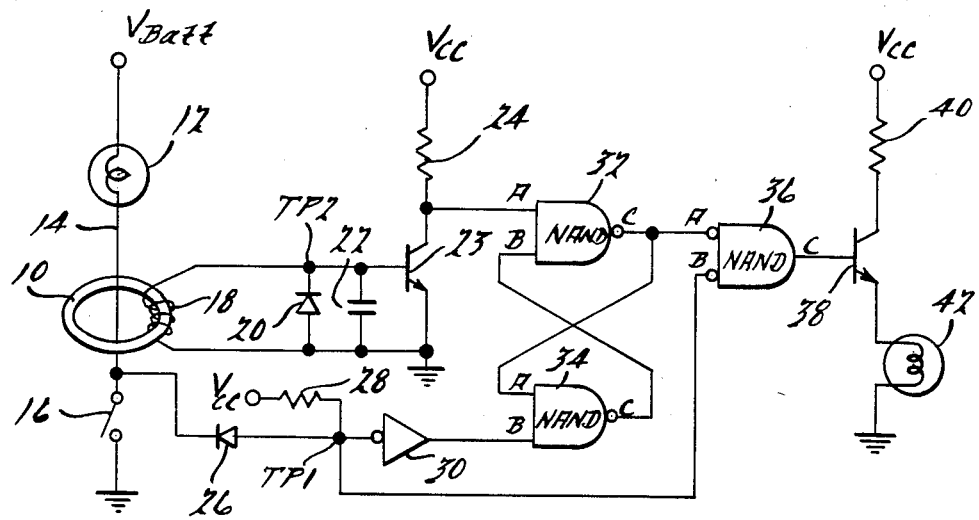
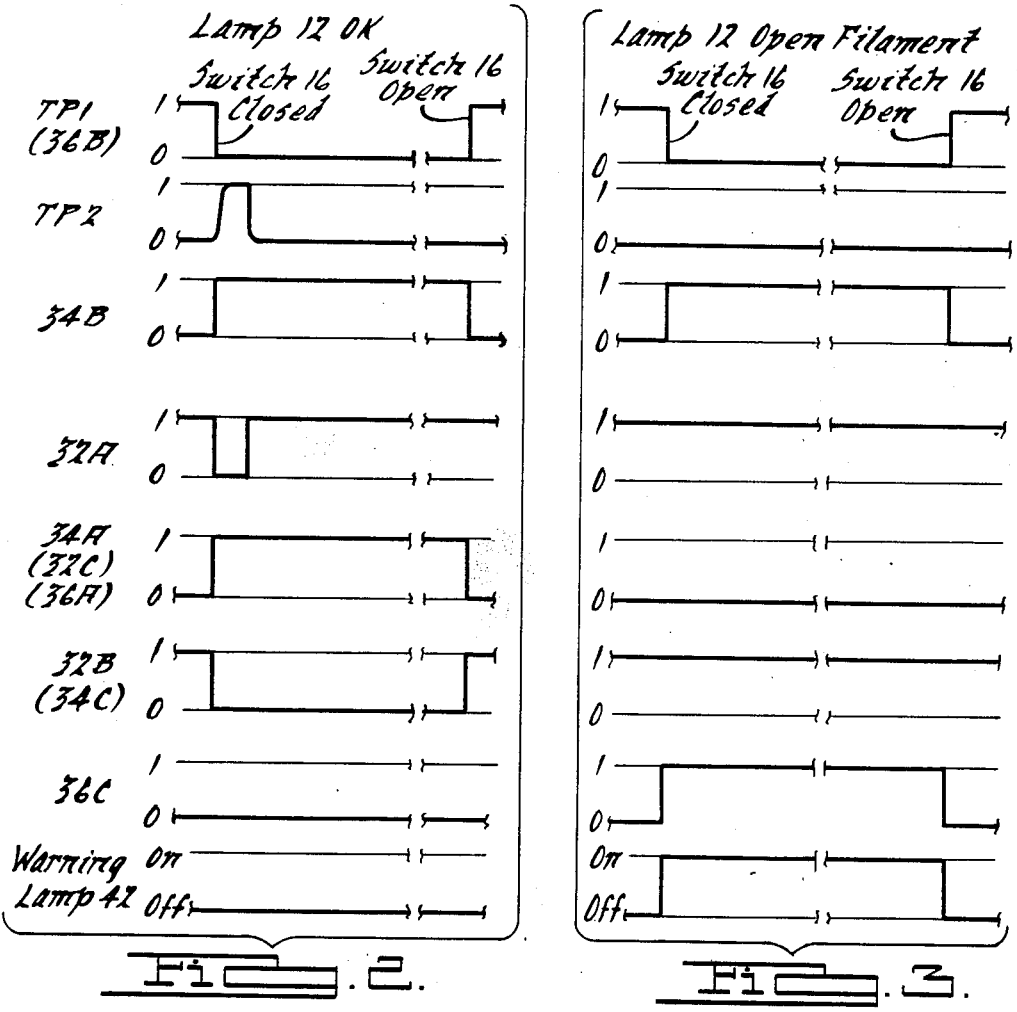

SYSTEM FOR DETECTING THE FAILURE OF A FILAMENT LAMP

BACKGROUND OF THE INVENTION

1. Field of the Invention

The present invention is directed to the field of detecting open circuits in electrical loads and more specifically to the area of lamp failure detection systems for use on automotive vehicles.

2. Summary of the Invention

The present invention is related to our copending U.S. application Ser. No. 817,224, titled "A LAMP FAILURE MONITORING SYSTEM" that is being filed concurrently herewith. In the present invention, a toroidal core transformer is employed to sense the initial current flow through a conductor connected to a single electrical load (filament lamp) when energized through a switching means. The output pulse provided across the toroidal core transformer is provided through a logic network. A sensing circuit monitors the switching device and provides an enabling signal to the logic network whenever the switching device is closed. In the absence of a pulse being sensed across the toroidal transformer, the logic network provides an output signal to an indicator means. The absence of such a pulse would indicate that the series circuit of the load from the switching means is opened. The latched output of the logic network is connected to a circuit that provides a continuous indication of the failure detection.

BRIEF DESCRIPTION OF THE DRAWINGS

FIG. 1 is a circuit diagram illustrating the present invention employed as a lamp outage indicator.

FIG. 2 is a diagram illustrating the various voltage levels occurring in the circuit of FIG. 1 when the integrity of the load circuit is functional.

FIG. 3 is a diagram illustrating the various voltage levels occurring in the circuit of FIG. 1 when the integrity of the load circuit is opened and nonfunctional.

DETAILED DESCRIPTION OF THE PREFERRED EMBODIMENT

In the circuit shown in FIG. 1, the electrical load is a filament lamp 12 connected to the positive pole of a source of electrical DC energy "$V_{batt}$" and in series with an electrical conductor 14. Electrical conductor 14 extends to a switch 16 which is actuatable to opened and closed states. The other side of switch 16 is shown as being connected to the negative pole of the D.C. energy source (i.e., ground).

A toroidal ferrite core of a transformer 10 surrounds the conductor 14 so that the conductor 14 passing through the core acts as a single turn primary winding. A secondary winding 18 is formed as a multi-turn secondary winding around a portion of the toroidal core 10.

A pulse forming network, made up of a diode 20 and a capacitor 22, is connected in parallel across the secondary winding 18 and between the base and emitter of a transistor 23. The emitter of thhe transistor 23, one side of capacitor 22 and the anode of diode 20 are commonly connected to ground. The collector of transistor 23 is connected through a pull-up resistor 24 to a circuit voltage source $V_{cc}$. ($V_{cc}$ may, in some cases, be the same as the load source voltage $V_{batt}$).

The pulse formed at the junction between the collector of transistor 23 and resistor 24 is provided to a logic network made up of inverted output NAND gates 32 and 34 and inverted input NAND gate 36. One input terminal "A" of NAND gate 32 is connected to the junction between the collector of transistor 23 and resistor 24 to receive the output of the pulse forming network.

A switch sensing circuit, made up of a diode 26, and a resistor 28, is connected to sense a ground connected through the switch 16 when it is actuated and changed from its opened state to its closed state. In that sensing circit, the catode of diode 26 is connected to the side of the switch 16 opposite the ground connection. The anode of diode 26 is connected to a resistor 28 and the input terminal of inverter 30. The other side of the resistor 28 is connected to the circuit voltage source $V_{cc}$. The connection of the resistor 28, the input of invertor 30 and the anode of diode 26 forms a junction TP1 which is also connected to the "B" input terminal and NAND gate 36.

The output of the inverter 30 provides the switch closing signal as an input to the "B" terminal of NAND gate 34. The "A" input terminal of NAND gate 34 is connected to receive the output single from the "C" terminal of NAND gate 32. The output signal of NAND gate 34 at terminal "C" is provided to the "B" input terminal of NAND gate 32. The signal at the "C" output terminal of NAND gate 32 is also connected to an inverting input terminal "A" of NAND gate 36. The "C" output terminal of NAND gate 36 is provided to the base of switching transistor 38, of an indicator circuit.

In the indicator circuit, an indicator lamp 42 is connected between the emitter of transistor 38 and ground, while the collector of transistor 38 is connected through a resistor 40 to the circuit voltage source $V_{cc}$.

In operation, the circuit shown in FIG. 1 functions to monitor both closing of the switch 16 and the flow of current in the conductor 14 as a normal occurrence in a functioning series load circuit provided by the lamp 12 and the conductor 14 between the switch and the source of DC energy. In the event the switch 16 is closed and no current flows through conductor 14 because of an open filament in the lamp 12 (or a faulty connector or severed conductor, etc.,) the circuit will sense this abnormality and provide an output to the indicator portion which produces a latched fault signal to the vehicle operator.

Specifically, with reference to both FIGS. 2 and 3, when the switch 16 is closed, the voltage level at TP1 will change from a relatively high level, that is present prior to switch closing, to a relatively low level. When switch 16 is closed, current flows from the voltage source $V_{cc}$ through the resistor 28, the diode 26 and the closed switch 16, to ground. The signal level appearing at 34B will be inverted through inverter 30 to a relatively high level. Of course the relatively low voltage level appearing at TP1 will also appear at 36B.

If the series circuit made up of the incandescent lamp 12 and conductor 14 has integrity so that the closing of the switch 16 causes current flow from the DC source through the lamp and the conductor 14 to ground as is shown in FIG. 2, the toroidal transformer 10 will pick up the change in current flow upon the closing of the switch 16 and a pulse will appear at TP2 of the pulse forming network. The positive going pulse appearing at TP2 will bias the transistor 23 to a conducting state during the period of the pulse and thereby provide an inverted version of the pulse at 32A. Since the output at 32C is normally at a low level, the input at 34A is also at a low level. The two normally low levels at NAND gate 34 provide a normally high level at 34C. This normally high level is provided as an input at 32B.

The 34B signal, provided through the inverter 30 by the closing of switch 16, goes to a relatively high level, but the output 34C continues at a relatively high level. The change to low level signal at 32A, from the sensed current flow in conductor 14, and the presence of the high level signal at 32B causes a change to a high level signal at 32C. That high level signal at 32C is provided as the input to 36A and, the output signal at 36C remains at a low level, and the transistor 38 remains biased in its nonconducting state. The 32C output level remains latched at a high level, even after the pulse provided at 32A returns to its high level.

If the lamp 12 has an open filament or some other abnormality occurs in that series circuit, which prevents current to flow when the switch 16 is closed, no pulse will appear at TP2. In that event, the input at 36B and the input at 36A will both be low level signals, as shown in FIG. 3. With both inputs at a low level, the NAND gate 36 provides a relatively high level output at 36C to bias the transistor 38 in its conducting state and therefore energize the indicator lamp 42. Lamp 42 provides the appropriate signal that a failure has occurred in the lamp 12 or its corresponding wiring circuit.

It should be apparent that the proposed monitoring circuit of the present invention is not only suitable for lamp outage indicators but also to sense the failure of any D.C. series circuit. On the other hand, the present invention has the advantage of sensing circuit operation while at the same time preventing any disturbance to the load circuit from any malfunction which may occur in the sensing circuit itself.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A system for detecting the failure of an filament lamp in a circuit to be energized when a source of DC energy is applied across said lamp circuit which includes a switch having selectable opened and closed states connected between said lamp and one pole of said DC source and a single conductor in series with said switch and said lamp, comprising:
   transformer means having defined primary and secondary windings and a toroidal core surrounding said conductor, wherein said conductor defines said primary winding of said transformer means;
   sensor means for detecting when said switch is selectably changed from its opened state to its closed state;
   pulse forming means connected to said secondary winding to provide an electrical pulse of a predetermined value and duration whenever DC current initially flows in said conductor; and
   logic means connected to both said pulse forming means and said sensor means for producing a failure signal when said switch is selectively changed from its opened state to its closed state and said pulse forming means fails to then provide an electrical pulse output.

2. A system as in claim 1, wherein said lamp contains a filament with one end connected to the positive pole of said DC source and the other end connected to said conductor.

3. A system as in claim 2, wherein said sensor means includes a diode and a voltage dropping resistor, said diode has its cathode connected to said switch and its anode connected to said dropping resistor and the other side of said dropping resistor is connected to the positive pole of said DC voltage source.

4. A system as in claim 3, wherein said logic means connection to said sensor means is made at the junction between said diode anode and said dropping resistor.

5. A system as in claim 1, wherein said toroidal core surrounds a portion of said conductor and said secondary winding is formed as a plurality of turns around a portion of said toroidal core.

6. A system for sensing and indicating an open condition in a series electrical circuit load extending between a source of DC electrical energy and an actuable switching device upon the application of said electrical energy to said load when said actuable switching device changes from an open to a closed condition, comprising:
   a toroid core transformer means with defined primary and secondary windings wherein said primary winding is an electrical conductor portion of said series circuit extending through said toroid core and said secondary winding is a coil having a plurality of turns around a portion of said core;
   logic means connected to said secondary winding of said transformer means and to said series circuit for providing an output signal upon the closing of said actuable switching device and the contemporaneous failure of current to flow in said circuit;
   indicator means connected to said logic means for receiving the output of said logic means and provide a humanly discernible indication whenever said output signal is present;
   means between said secondary winding and said logic means for forming an electrical pulse of a predetermined voltage value and duration when said current is caused to initially flow in said primary winding; and
   means connected between said actuable switching device and said logic means for detecting the actuation of said switching device from an open to a closed condition and providing an electrical voltage level output to said logic means corresponding to said actuable switching device being in its open or closed condition.

* * * * *